(12) United States Patent
Kuroda et al.

(10) Patent No.: US 8,657,520 B2
(45) Date of Patent: Feb. 25, 2014

(54) BALL JOINT APPARATUS

(75) Inventors: Shigeru Kuroda, Yokohama (JP); Shuji Ohmura, Yokohama (JP)

(73) Assignee: NHK Spring Co., Ltd., Tokyo (JP)

( * ) Notice: Subject to any disclaimer, the term of this patent is extended or adjusted under 35 U.S.C. 154(b) by 0 days.

(21) Appl. No.: 13/570,500

(22) Filed: Aug. 9, 2012

(65) Prior Publication Data

US 2012/0301213 A1 Nov. 29, 2012

Related U.S. Application Data

(63) Continuation of application No. PCT/JP2011/053255, filed on Feb. 16, 2011.

(30) Foreign Application Priority Data

Feb. 16, 2010 (JP) .................................. 2010-031745

(51) Int. Cl.
F16C 11/00 (2006.01)

(52) U.S. Cl.
USPC ............................. 403/135; 403/132; 403/133

(58) Field of Classification Search
USPC .................... 403/50, 122, 132, 133, 135, 140
See application file for complete search history.

(56) References Cited

U.S. PATENT DOCUMENTS

| | | | | |
|---|---|---|---|---|
| 5,163,769 A | * | 11/1992 | Dresselhouse | 403/27 |
| 5,427,467 A | * | 6/1995 | Sugiura | 403/140 |
| 5,601,378 A | | 2/1997 | Fukukawa et al. | |
| 5,997,208 A | * | 12/1999 | Urbach et al. | 403/137 |
| 6,736,565 B2 | * | 5/2004 | Tamatsu et al. | 403/122 |
| 6,824,300 B2 | * | 11/2004 | Drews et al. | 362/515 |
| 7,134,801 B2 | | 11/2006 | Kuroda | |

FOREIGN PATENT DOCUMENTS

| | | |
|---|---|---|
| JP | 8-159147 A | 6/1996 |
| JP | 2002-295444 A | 10/2002 |

OTHER PUBLICATIONS

International Search Report dated Mar. 15, 2011 (in English) in counterpart International Application No. PCT/JP2011/053255.

* cited by examiner

*Primary Examiner* — Gregory Binda
*Assistant Examiner* — Nahid Amiri
(74) *Attorney, Agent, or Firm* — Holtz, Holtz, Goodman & Chick, PC

(57) ABSTRACT

A ball seat made of a resin material having a recessed spherical surface and an external peripheral surface, a stud ball having a spherical head portion that engages with the recessed spherical surface in a rotatable manner, and a housing that accommodates the ball seat which is inserted from an opening portion toward a bottom surface, and comprises a ball seat insertion unit where an inner peripheral surface is engaged with an external peripheral surface of the ball seat are provided, wherein an external diameter of the external peripheral surface increases from the bottom surface toward the opening portion, and an internal diameter of the inner peripheral surface increases from the bottom surface toward the opening portion.

7 Claims, 7 Drawing Sheets

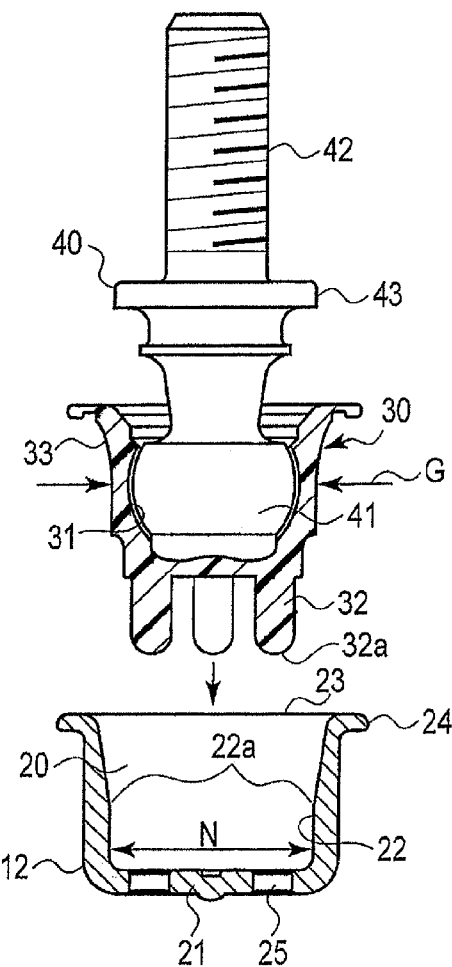
F I G. 2
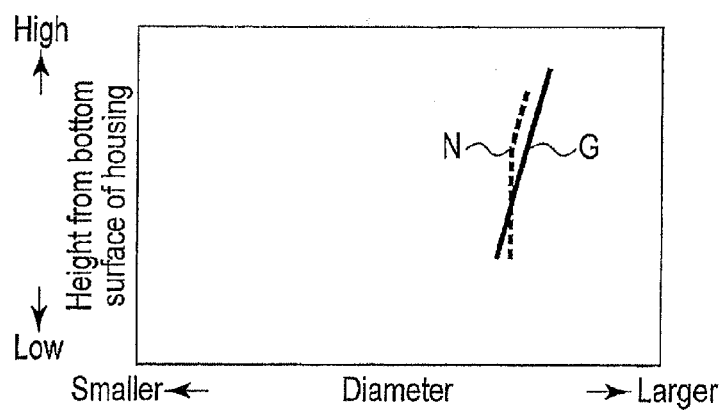
F I G. 3

BALL JOINT APPARATUS

CROSS-REFERENCE TO RELATED APPLICATIONS

This application is a Continuation Application of PCT Application No. PCT/JP2011/053255, filed Feb. 16, 2011 and based upon and claiming the benefit of priority from prior Japanese Patent Application No. 2010-031745, filed Feb. 16, 2010, the entire contents of all of which are incorporated herein by reference.

BACKGROUND OF THE INVENTION

1. Field of the Invention

The present invention relates to a ball joint apparatus used in mechanical element connection portions and the like of various machines. More particularly, the present invention relates to a technique capable of reducing a vibration/sliding torque and an elastic lift.

2. Description of the Related Art

In a vehicle stabilizer, a stabilizer bar is coupled with suspension devices of a vehicle, and the vehicle stabilizer has a function of stabilizing a posture of a vehicle using torsional reaction force of the stabilizer bar. For example, in a vehicle stabilizer, both ends of the stabilizer bar formed in a U-shape are coupled with operation portions of the suspension devices, and torsion portions of the stabilizer bar are fixed to fixing members of a vehicle frame, so that it is configured to receive the torsional reaction force.

A ball joint apparatus for connecting a stabilizer, a strut, arms and the like is used as an apparatus constituting a vehicle stabilizer (see, for example, Japanese Patent No. 3168229 and Japanese Patent No. 3369659).

FIG. 7 is a cross-sectional view illustrating an example of a ball joint apparatus. As illustrated in FIG. 7, the ball joint apparatus 310 comprises a rod member 311 and housings 312 integrally provided at end portions of this rod member 311. Deformation edge portions 314 are respectively provided at both right and left side portions of the rod member 311.

As illustrated in FIG. 8, the housing 312 includes a ball seat insertion unit 320 drawn into a cylindrical shape and a bottom surface 321 located at an end portion of the ball seat insertion unit 320. A flange portion 323 is provided at an opening portion of the ball seat insertion unit 320. A plurality of holes 324 are punched through the bottom surface 321.

A ball seat 330 is accommodated in the ball seat insertion unit 320. This ball seat 330 is made of a thermoplastic synthetic resin, and includes a recessed spherical surface 331 and an external peripheral surface 332.

A spherical head portion 341 of a stud ball 340 is engaged with the recessed spherical surface 331 of the ball seat 330 in a rotatable manner. The stud ball 340 includes not only the spherical head portion 341 but also a screw portion 342 and a large diameter portion 343, and a dust cover 345 is provided between a flange portion 344 and the large diameter portion 343 of the ball seat 330.

In the ball joint apparatus thus configured, as the suspension of the vehicle moves for a stroke, the stud ball 340 and ball seat 330 make vibrating/sliding movement. The characteristic during the swing/sliding movement is defined as a swing/sliding torque or a swing movement torque and a rotation torque.

The internal diameter of the inner peripheral surface of the housing 312 is formed to be less than the external diameter of the external peripheral surface of the ball seat 330, so that the ball seat 330 is sufficiently fixed within the housing 312 using elastic force. A difference between the internal diameter of the inner peripheral surface of the housing 312 and the external diameter of the external peripheral surface of the ball seat 330 is called as a tightening margin.

In recent years, demand to reduce suspension friction has increased in order to improve the riding comfort of vehicles, and it is required to reduce the swinging/sliding torque of the ball joint apparatus, i.e., one of suspension components. When the tightening margin is large, the ball seat 330 is pressed to the inside by the housing 312, and this reduces the clearance between the ball seat and the stud, and increases the swinging/sliding torque (for example, 1.6 Nm or more), which deteriorates the riding comfort. Therefore, a low-torque-type ball seat (for example, 1.0 Nm or less) that improves the riding comfort by reducing the tightening margin is considered.

BRIEF SUMMARY OF THE INVENTION

A ball joint apparatus using the low-torque-type ball seat explained above has the following problems. That is, the ball seat is a resin component manufactured by injection-molding, and therefore, because of the thermal shrinkage during the molding, the external diameter of the external peripheral surface of the ball seat becomes not constant, and the ball seat is in a tapered shape extending toward an opening side. In contrast, as illustrated in FIG. 8, the inner peripheral surface of the recessed portion of the housing is in a straight shape (the internal diameter is constant).

FIG. 9 is an explanatory diagram illustrating relationship between an internal diameter of an inner peripheral surface of a housing (R) and an external diameter of an external peripheral surface of a ball seat. A conventional ball seat (Qa) has a sufficient tightening margin, and therefore, a region in which the ball seat and the housing are in close contact with each other is wide, which stabilizes the support. However, in the low-torque-type ball seat (Qb) in which the tightening margin is small, the clearance between the ball seat and the housing is excessively large in some portion (elastic lift), and the contact between the stud ball and the ball seat becomes localized (X). This occurs as rattling, and may be a factor of causing uncomfortable noise and vibration. It should be noted that the elastic lift is deformation when a load is applied.

FIGS. 10 and 11 are explanatory diagrams illustrating relationship between load and deformation before and after an endurance test of a ball joint apparatus, and comparing a case of an ordinary ball seat and a case of a low-torque-type ball seat. When the inner peripheral surface of the housing is constant, the amount of elastic lift increases when the tightening margin decreases using the low-torque-type ball seat, and after the test, the ball seat is deformed, and this causes rattling.

FIG. 12 is an explanatory diagram illustrating tightening margin and vibration/sliding torque of the housing and the ball seat incorporated into the ball joint apparatus. It is understood that when the tightening margin decreases, the vibration/sliding torque decreases. FIG. 13 is an explanatory diagram illustrating a tightening margin and an elastic lift of the housing and the ball seat incorporated into the ball joint apparatus. It is understood that when the tightening margin decreases, the amount of elastic lift increases.

Accordingly, it is an object of the present invention to provide a ball joint apparatus capable of reducing a vibration/sliding torque without increasing an elastic lift.

In order to satisfy the above object, in a ball joint apparatus according to the present invention, the ball joint apparatus comprises a ball seat made of a resin material having a recessed spherical surface and an external peripheral surface; a stud ball having a spherical head portion that engages with the recessed spherical surface in a rotatable manner; and a housing that accommodates the ball seat which is inserted from an opening portion toward a bottom surface, and comprises a recessed portion where an inner peripheral surface thereof is engaged with an external peripheral surface of the ball seat, wherein an external diameter of the external peripheral surface increases from the bottom surface toward the opening portion, and there is a region where an internal diameter of the inner peripheral surface at least increases from the bottom surface toward the opening portion.

BRIEF DESCRIPTION OF THE SEVERAL VIEWS OF THE DRAWING

FIG. 2 is an exploded cross-sectional view illustrating the ball joint apparatus.

FIG. 3 is an explanatory diagram illustrating relationship between an external diameter of an external peripheral surface of a ball seat and an internal diameter of an inner peripheral surface of a housing incorporated into the ball joint apparatus.

DETAILED DESCRIPTION OF THE INVENTION

Figure 1:
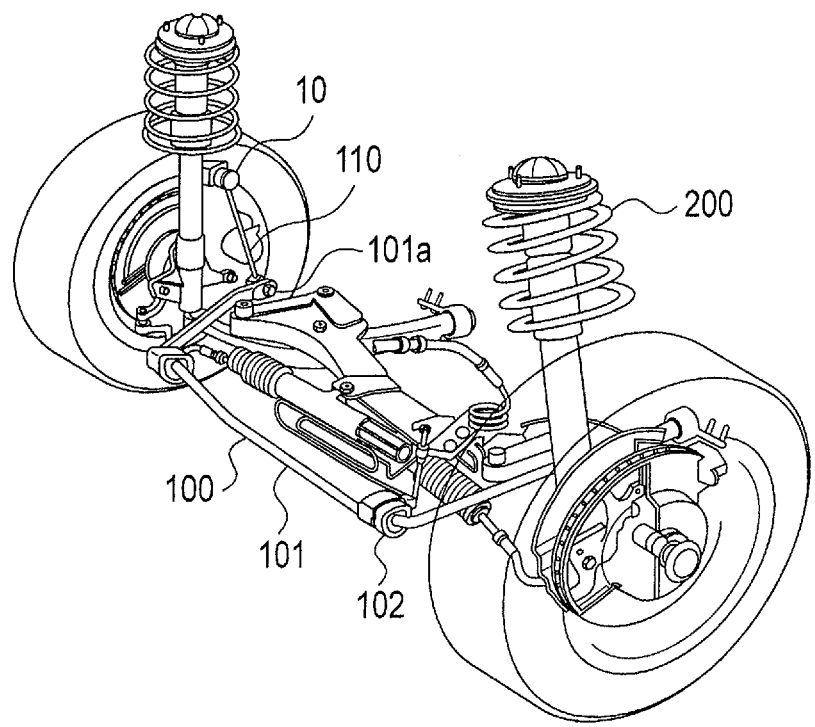
FIG. 1 is a perspective view illustrating suspension devices of front wheels of a vehicle and a vehicle stabilizer having a ball joint apparatus according to an embodiment of the present invention incorporated therein.

FIG. 1 is a perspective view illustrating suspension devices 200 of front wheels of a vehicle and a vehicle stabilizer 100 having a ball joint apparatus 10 according to an embodiment of the present invention incorporated therein. FIG. 2 is an exploded cross-sectional view illustrating the ball joint apparatus 10.

As illustrated in FIG. 1, the vehicle stabilizer 100 includes a stabilizer bar 101 made of a hollow member, fixing members 102 for fixing the stabilizer bar 101 to a frame portion (not shown) of the vehicle, and stabilizer links 110 each connecting a front end 101a of the stabilizer bar 101 to the suspension device 200. The ball joint apparatus 10 constitutes a part of the stabilizer link 110.

As illustrated in FIG. 2, the ball joint apparatus 10 includes a metallic housing 12. The housing 12 is a press-molded product made of a metallic plate such as a steel plate, and is formed by drawing.

The housing 12 includes a ball seat insertion unit (recessed portion) 20 drawn into a cylindrical shape, a bottom surface 21 located at an end portion of the ball seat insertion unit 20, and an inner peripheral surface 22. A flange portion 24 is provided at an opening portion 23 of the ball seat insertion unit 20. A plurality of holes 25 are punched through the bottom surface 21. An internal diameter N of the inner peripheral surface 22 is constant from the bottom surface 21 to a middle portion 22a, and the internal diameter N of the inner peripheral surface 22 increases from the middle portion 22a toward the opening portion 23.

A ball seat 30 is accommodated in the ball seat insertion unit 20. For example, this ball seat 30 is made of thermoplastic synthetic resin such as polyacetal and polybutylene terephthalate, and is formed in a cylindrical shape with a bottom. The ball seat 30 has a recessed spherical surface 31 in the inside, and has protrusions 32 and an external peripheral surface 33 at the bottom portion. An external diameter G of the external peripheral surface 33 extends from the bottom surface 21 toward the opening portion 23.

As illustrated in FIG. 2, on the bottom surface of the ball seat 30, the plurality of protrusions 32 are provided at positions corresponding to the holes 25. After the protrusion 32 is inserted into the hole 25, a portion 32a of the protrusion 32 protruding to the outside from the hole 25 is softened by applying heat from the outside or by heat application with high-frequency induction, and the portion 32a is crushed in an axial direction, whereby the ball seat 30 is fixed to the housing 12.

A spherical head portion 41 of a stud ball 40 is engaged with the recessed spherical surface 31 of the ball seat 30 with a rotatable manner. The stud ball 40 includes not only the spherical head portion 41 but also a screw portion 42 and a large diameter portion 43.

In this case, using FIG. 3, relationship between the internal diameter N of the inner peripheral surface 22 of the housing 12 and the external diameter G of the external peripheral surface of the ball seat 30 will be explained.

That is, the external diameter G of the external peripheral surface is formed to be less than the internal diameter N of the inner peripheral surface at the side of the bottom surface of the recessed portion, and is formed to be more than the internal diameter N of the inner peripheral surface at the side of the opening portion of the recessed portion.

With this configuration, localized contact can be avoided, and the tightening margin is reduced as a whole. The increase of the elastic lift can be suppressed. As a result, there is an effect of improving the riding comfort of the vehicle (in particular, very small amplitude region). It should be noted that the regular sliding torque/rotation torque is preferably equal to or less than 1.0 Nm.

By controlling the tightening margin as described above, not only the regular sliding/rotation torque and the elastic lift but also the load without the stud and the like can be set at desired values. In addition, a taper start point, a taper angle, and the number of tapers may also be changed.

It should be noted that the housing 12 is press-molded, and can be formed without machine work. Therefore, it is not necessary to greatly modify the existing manufacturing line, and the existing manufacturing cost and the existing product cost can be reduced to the minimum.

Figure 4:
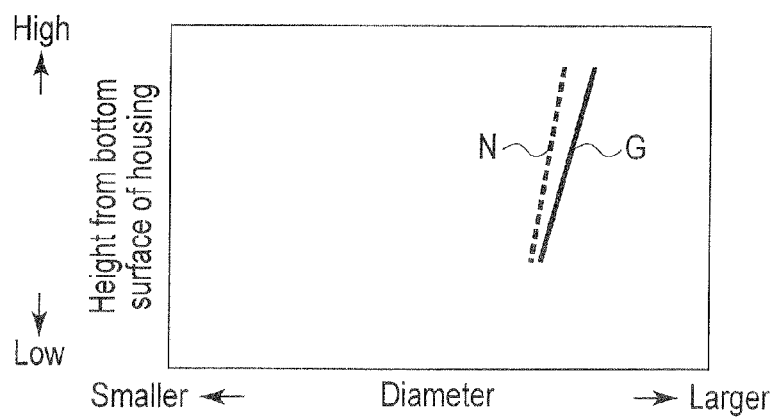
FIG. 4 is an explanatory diagram illustrating relationship between an external diameter of an external peripheral surface of a ball seat and an internal diameter of an inner peripheral surface of a housing, according to a first modification incorporated into the ball joint apparatus.
Figure 5:
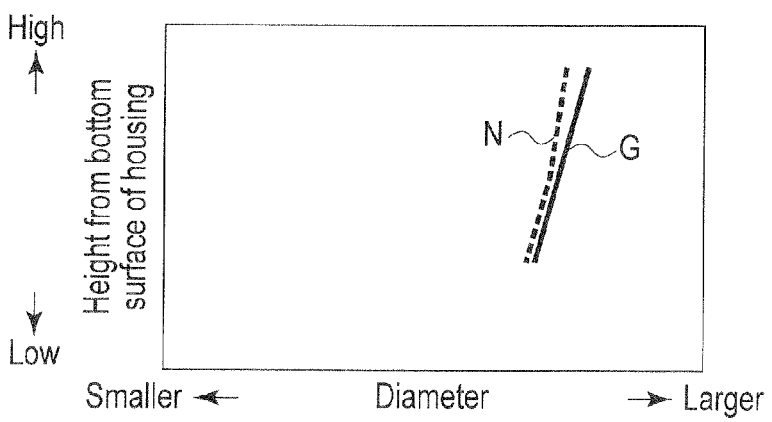
FIG. 5 is an explanatory diagram illustrating relationship between an external diameter of an external peripheral surface of a ball seat and an internal diameter of an inner peripheral surface of a housing, according to a second modification incorporated into the ball joint apparatus.
Figure 6:
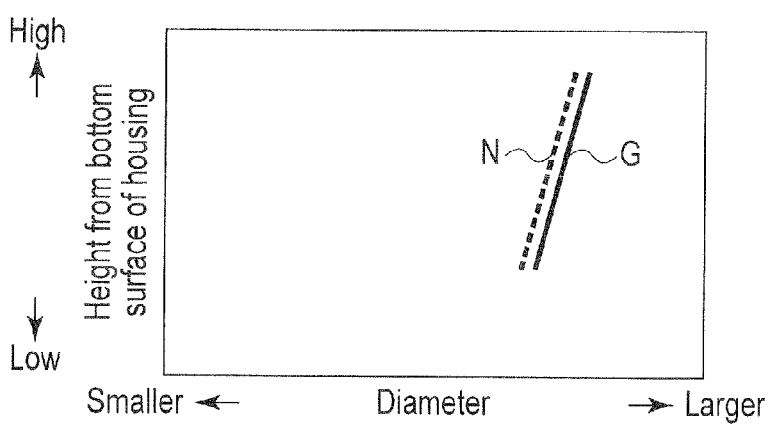
FIG. 6 is an explanatory diagram illustrating relationship between an external diameter of an external peripheral surface of a ball seat and an internal diameter of an inner peripheral surface of a housing, according to a third modification incorporated into the ball joint apparatus.
Figure 7:
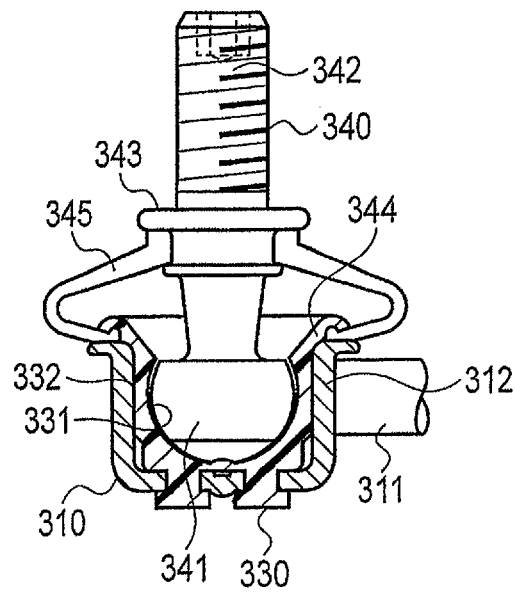
FIG. 7 is a cross-sectional view illustrating an example of a ball joint apparatus.
Figure 8:
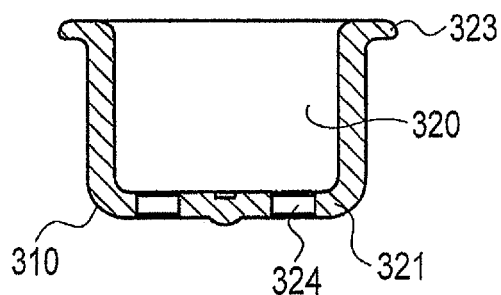
FIG. 8 is a cross-sectional view illustrating a housing incorporated into the ball joint apparatus.
Figure 9:
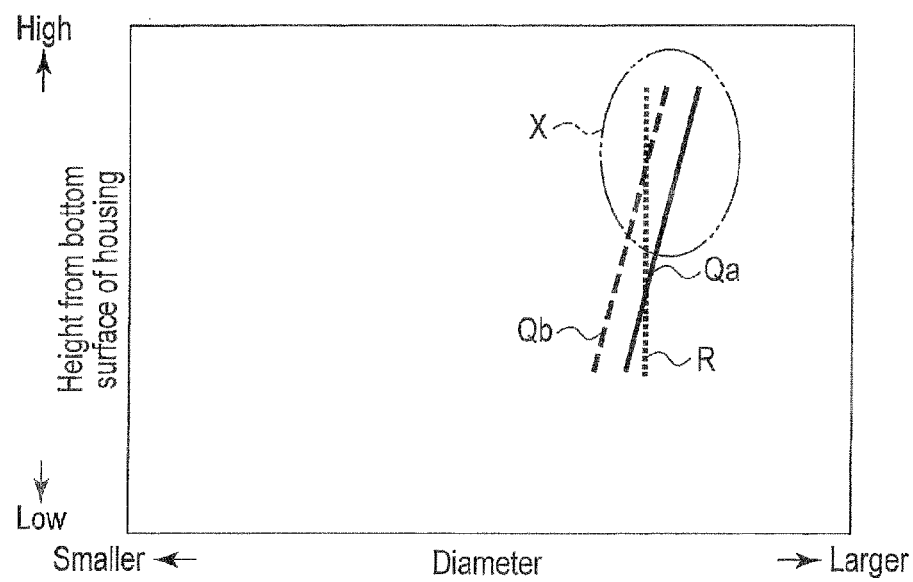
FIG. 9 is an explanatory diagram illustrating relationship between an external diameter of an external peripheral surface of a ball seat and an internal diameter of an inner peripheral surface of a housing incorporated into the ball joint apparatus.
Figure 10:
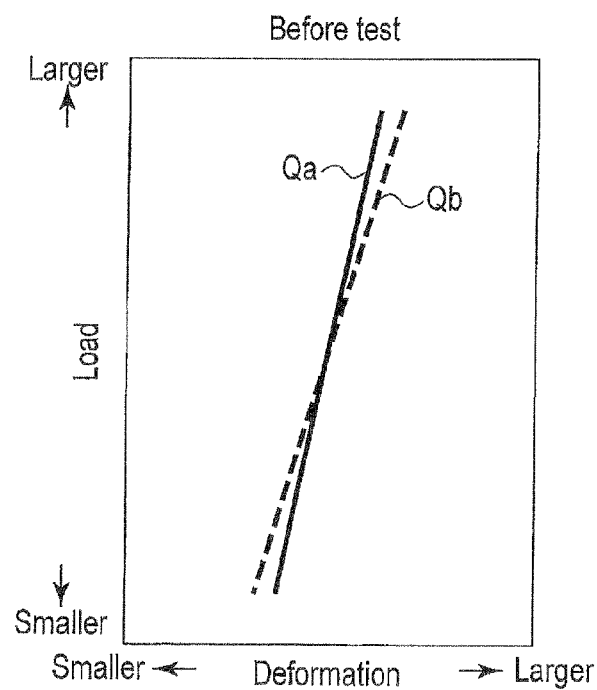
FIG. 10 is an explanatory diagrams illustrating relationship between load and deformation before and after a test of the ball joint apparatus, and comparing a case of an ordinary ball seat and a case of a low-torque-type ball seat.
Figure 11:
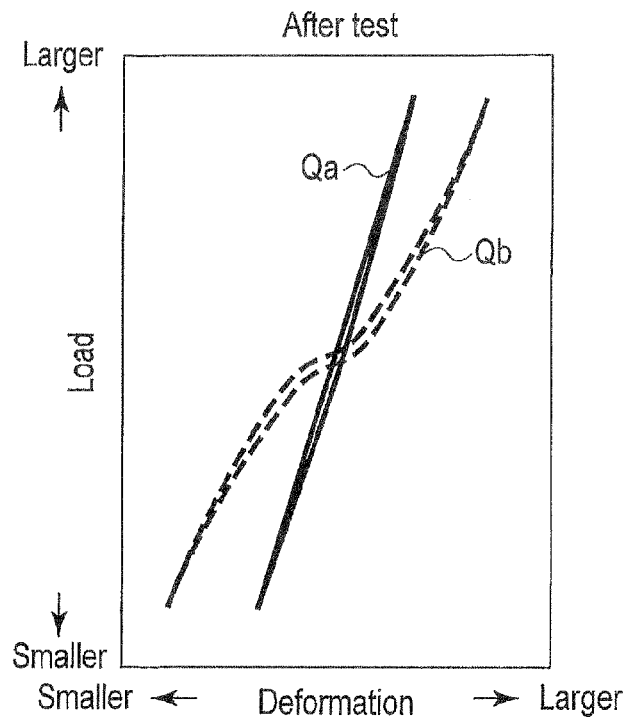
FIG. 11 is an explanatory diagrams illustrating relationship between load and deformation before and after the test of the ball joint apparatus, and comparing the case of the ordinary ball seat and the case of the low-torque-type ball seat.
Figure 12:
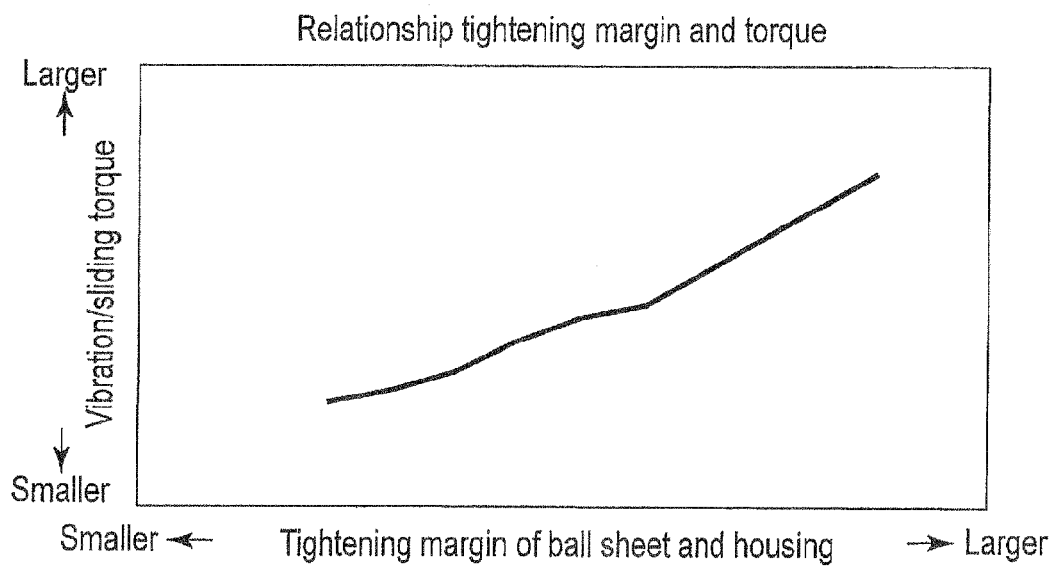
FIG. 12 is an explanatory diagram illustrating relationship between a tightening margin and a vibration/sliding torque of the ball seat and the housing incorporated into the ball joint apparatus.
Figure 13:
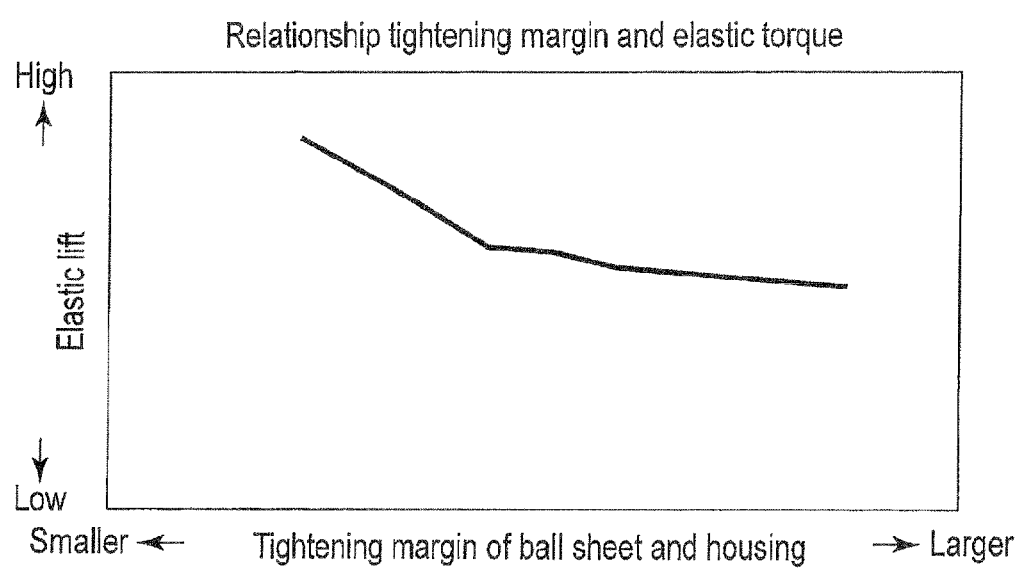
FIG. 13 is an explanatory diagram illustrating relationship between a tightening margin and an elastic lift of the ball seat and the housing incorporated into the ball joint apparatus.

FIGS. 4 to 6 variously change a difference between the external diameter G of the external peripheral surface and the internal diameter N of the inner peripheral surface, and illustrate an example where the riding comfort can be set in details. In any of them, the same effects as those of the above embodiment can be obtained.

In the first modification as illustrated in FIG. 4, the external diameter G of the external peripheral surface is formed to be more than the internal diameter N of the inner peripheral surface, and a difference between the external diameter G of the external peripheral surface and the internal diameter N of the inner peripheral surface is set so that the difference between the external diameter G of the external peripheral surface and the internal diameter N of the inner peripheral surface monotonically increases from the bottom surface 21 to the opening portion 23.

In the second modification as illustrated in FIG. 5, the difference between the external diameter G of the external peripheral surface and the internal diameter N of the inner peripheral surface is set to be constant from the bottom surface 21 to the middle portion, and set so that the difference between the external diameter G of the external peripheral surface and the internal diameter N of the inner peripheral surface monotonically increases from the middle portion toward the opening portion.

In the third modification as illustrated in FIG. 6, the difference between the external diameter G of the external peripheral surface and the internal diameter N of the inner peripheral surface is constant from the bottom surface 21 to the opening portion.

As described above, in the stabilizer bar 20 incorporated into the vehicle stabilizer 10 according to the present embodiment, even when the hollow member is used for reducing the weight, uniformization of principal stress can be achieved, like a solid member, using simple design and manufacturing method.

It should be noted that the present invention is not limited to the above embodiment. It is to be understood that it is possible to carry out the present invention upon applying modifications in various manners without deviating from the gist of the present invention.

The ball joint apparatus capable of reducing the vibration/sliding torque without increasing the elastic lift can be provided.

What is claimed is:
1. A ball joint apparatus comprising:
a ball seat made of a resin material having a recessed spherical surface and an external peripheral surface;
a stud ball having a spherical head portion that engages with the recessed spherical surface in a rotatable manner; and
a housing comprising a recessed portion that accommodates the ball seat, which is inserted from an opening portion of the housing toward a bottom surface of the housing;
wherein an inner peripheral surface of the recessed portion is engaged with the external peripheral surface of the ball seat when the ball seat and the housing are assembled;
wherein an external diameter of the external peripheral surface increases from the bottom surface toward the opening portion, and the inner peripheral surface has a region where an internal diameter of the inner peripheral surface increases from the bottom surface toward the opening portion; and
wherein, below a flange of the housing and before the ball seat and the housing are assembled, the external diameter of the external peripheral surface is (i) less than the internal diameter of the inner peripheral surface at a side of the bottom surface of the recessed portion, and (ii) greater than the internal diameter of the inner peripheral surface at a side of the opening portion of the recessed portion.

2. The ball joint apparatus according to claim 1, wherein a swinging/sliding torque between the stud ball and the ball seat is less than or equal to 1.0 Nm.

3. A ball joint apparatus comprising:
a ball seat made of a resin material having a recessed spherical surface and an external peripheral surface;
a stud ball having a spherical head portion that engages with the recessed spherical surface in a rotatable manner; and
a housing comprising a recessed portion that accommodates the ball seat, which is inserted from an opening portion of the housing toward a bottom surface of the housing;
wherein an inner peripheral surface of the recessed portion is engaged with the external peripheral surface of the ball seat when the ball seat and the housing are assembled;
wherein an external diameter of the external peripheral surface increases from the bottom surface toward the opening portion, and the inner peripheral surface has a region where an internal diameter of the inner peripheral surface increases from the bottom surface toward the opening portion; and
wherein, below a flange of the housing and before the ball seat and the housing are assembled, the external diameter of the external peripheral surface is greater than the internal diameter of the inner peripheral surface.

4. The ball joint apparatus according to claim 3, wherein a difference between the external diameter of the external peripheral surface and the internal diameter of the inner peripheral surface, before the ball seat and the housing are assembled, monotonically increases from the bottom surface toward the opening portion.

5. The bail joint apparatus according to claim 3, wherein a difference between the external diameter of the external peripheral surface and the internal diameter of the inner peripheral surface, before the ball seat and the housing are assembled, is constant from the bottom surface to a middle portion, and monotonically increases from the middle portion toward the opening portion.

6. The ball joint apparatus according to claim 3, wherein a difference between the external diameter of the external peripheral surface and the internal diameter of the inner peripheral surface, before the ball seat and the housing are assembled, is constant from the bottom surface to the opening portion.

7. The ball joint apparatus according to claim 3, wherein a swinging/sliding torque between the stud ball and the ball seat is less than or equal to 1.0 Nm.

* * * * *